Oct. 21, 1924.
L. DUCKETT
ADJUSTABLE BAIL CONNECTION
Filed July 13, 1923
1,512,163
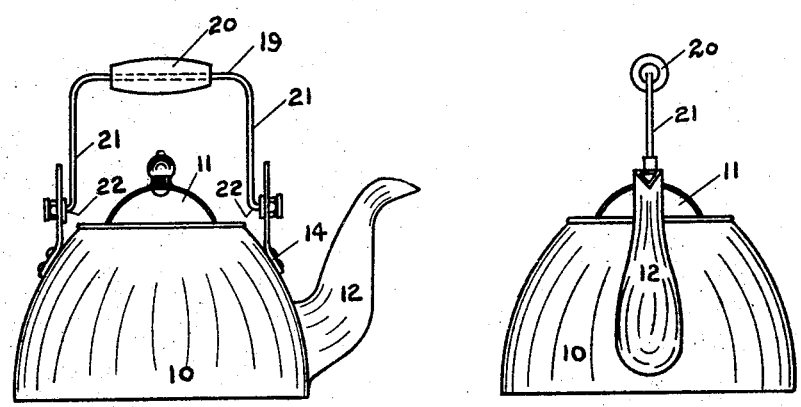
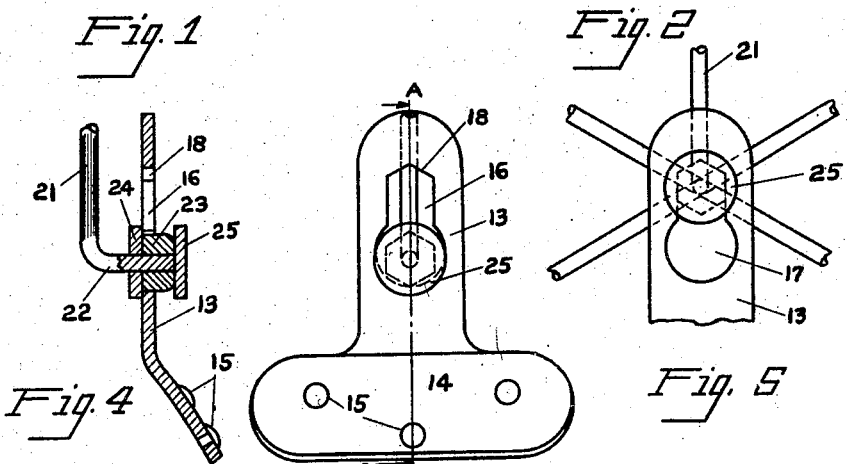
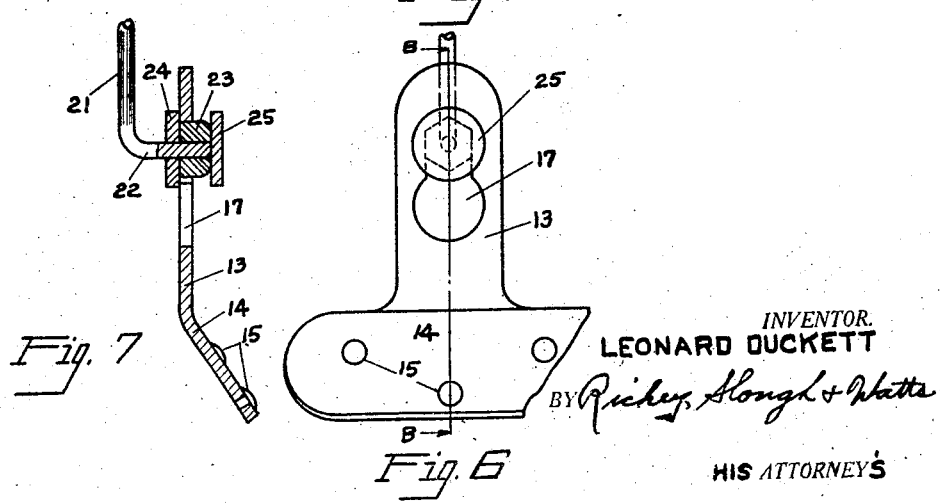
INVENTOR.
LEONARD DUCKETT
HIS ATTORNEYS Patented Oct. 21, 1924.

1,512,163

UNITED STATES PATENT OFFICE.

LEONARD DUCKETT, OF ELYRIA, OHIO.

ADJUSTABLE BAIL CONNECTION.

Application filed July 13, 1923. Serial No. 651,254.

*To all whom it may concern:*

Be it known that I, LEONARD DUCKETT, a subject of the King of England, residing at Elyria, in the county of Lorain and State of Ohio, have invented a certain new and useful Improvement in Adjustable Bail Connections, of which the following is a specification, reference being had therein to the accompanying drawings.

This invention relates to improvements in adjustable bail connections for kettles and similar receptacles.

An object of my invention is to provide a connection between a bail and a receptacle, which will permit the bail to be readily adjusted relative to the receptacle, and which will rigidly maintain the bail with the receptacle in desired adjusted position when said receptacle is suspended by said bail.

Another object of my invention resides in providing a container with ears having a single means for permitting adjustment of a bail, and for rigidly maintaining said bail in any one of a plurality of positions relative to said receptacle when the receptacle is suspended from the bail.

Another object of my invention resides in providing a connection between a receptacle and a bail, which consists of slotted ears secured to a receptacle and hexagonal bearings, any two opposite sides of which can be extended longitudinally within the slot to rigidly maintain the bail with the receptacle when the receptacle is suspended from the bail.

These and other objects will appear hereinafter.

In the drawings, Fig. 1 is a side elevation of a kettle having my improved bail connection therewith.

Fig. 2 is a front elevation of the same.

Fig. 3 is a front elevation of an ear with the bail in position to be rotated.

Fig 4 is a section taken on line A—A of Fig. 3.

Fig. 5 is a side elevation of a portion of the ear with the bail shown in the several positions in which it may be maintained.

Fig. 6 is a front elevation of an ear with the bail in position when the kettle is suspended thereby.

Fig. 7 is a section taken on line B—B of Fig. 6.

Referring to the drawings by characters of reference, 10 designates the container of a kettle, having a removable top 11 and a spout 12 of conventional design.

Upstanding ears 13 are provided with attaching faces 14 at the bottom, which faces are riveted to the container at 15. The ears are secured in alignment with the spout on opposite sides of the container 10. Such an arrangement being for the purpose of more easily pouring all of the contents in the container through the spout.

The ears are provided with vertical slots 16 which terminate in enlarged circular openings 17 at their lower ends and in angular substantially V shaped upper ends 18.

The bail 19 is provided with a hand grip 20 and has downwardly extending arms 21 terminating in out turned ends 22. Hexagonal bearing members 23 are secured to the bail ends 22 in any suitable manner, such as by welding, and washers 24 and 25 are secured respectively to the inner and outer ends of the bearings in a similar manner. The bail is of such length as to extend between the ears, so that the bearings 23 will extend through the slots within which they are secured by the washers which are of larger diameter than any part of the slots.

When the kettle is not in use the bail will extend at the side of the container and the hexagonal bearings will lie in the enlarged bottom portion of the slots, wherein they can be rotated, as they are of less diameter than the enlarged portion of the slots. When the user desires to lift the container, he grasps the bail and moves it to any position relative to the container in which two opposite sides of the hexagonal bearings will enter the slots, within the limits of the rotation of the bearings, and by an upward movement of the bail, the bearings will be moved to the top end of the slots. The possible positions of the bail are only limited by the number of the bearing sides, and with hexagonal bearings the bail may be maintained in five positions relative to the container, as illustrated in Fig. 5 of the drawings. The width of the slots is substantially the same as the diameter of the hexagonal bearings taken across two opposite sides, thereby the bail will be maintained substantially rigid, relative to the container, when the bearings are moved to the upper end of the slots. The angular upper end of the slots is designed to receive an angular side of the bearings, which also adds to the rigidity between the bail and the container when the container is suspended by the bail.

It will be seen that I have provided a bail connection, which is adjustable relative to a container and which can readily be changed to provide any one of a plurality of angular relations of the bail relative to the container, and which maintains the bail in rigid relation with the container, when the container is suspended from the bail. It will also be noted that the above relation is made and maintained by the adjustment of the bail bearings in a single slot in the container ears.

When the bail is adjusted to extend from either side of the kettle, the bail is out of alignment with the spout, and the hot contents can be poured out without the steam and heat arising against the user's hand.

This connection may be applied to various kinds of containers and I do not limit my invention to the illustrated application thereof, nor to the details of construction in which changes may be made without departing from the spirit of my invention and the scope of the claims made.

What is claimed is:

1. In combination with a receptacle, a bail having a journal at one end, and an ear secured to said receptacle provided with a single bearing, said journal cooperating with said bearing to maintain said bail rigidly with said receptacle in any one of a plurality of positions relative thereto when said receptacle is suspended from said bail.

2. In combination with a receptacle, a bail having a journal at one end, and an ear secured to said receptacle provided with a single bearing, said journal cooperating with said bearing to maintain said bail rigidly with said receptacle in any one of a plurality of positions relative to said receptacle when said receptacle is suspended from said bail, said journal being adjustable relative to said bearing when said receptacle is not suspended by said bail.

3. In combination with a receptacle, a bail having a bearing at each end, and a pair of ears secured to opposite sides of said receptacle, said ears being provided with slots into which said bearings extend to rigidly maintain said bail in any one of a plurality of positions relative to said receptacle when said receptacle is suspended from said bail.

4. In combination with a receptacle, a bail having a hexagonal bearing at each end, and ears secured to opposite sides of said receptacle, said ears each having a slot therein and an enlarged opening to receive said hexagonal bearings, the bearings being rotatable in said openings and maintained rigidly in the slots in any one of a plurality of positions when said receptacle is suspended from said bail.

5. In combination with a receptacle, a bail having a hexagonal bearing at each end, and ears secured to opposite sides of said receptacle, said ears each having a slot therein and an enlarged opening to receive said hexagonal bearings, the bearings being rotatable in said openings and maintained rigidly in the slots in any one of a plurality of positions when said receptacle is suspended from said bail, and means to prevent the removal of said bearings from the slots and openings in said ears when assembled therewith.

6. In combination with a receptacle, a bail having a hexagonal bearing at each end, and ears secured to opposite sides of said receptacle, said ears having aligned slots terminating in enlarged openings at their lower ends, said bearings extending through said ears, being freely rotatable in the enlarged openings and being non-rotatable when extended within the slots by the suspension of said receptacle from said bail.

7. In combination with a receptacle, a bail having a hexagonal bearing at each end, and ears secured to opposite sides of said receptacle, said ears having aligned slots terminating in an angular upper end and an enlarged lower end, said hexagonal bearings extending through and secured to said ears, being freely rotatable when within the enlarged ends of said slots and non-rotatable when seated within the angular upper end of the slots, said hexagonal bearings being rotatable to enter said slots to position said bail at the desired angular relation with said receptacle.

In witness whereof, I hereunto affix my signature this 11 day of July, 1923.

LEONARD DUCKETT.